US012595810B1

(12) United States Patent (10) Patent No.: US 12,595,810 B1

Benli et al. (45) Date of Patent: Apr. 7, 2026

(54) MORPHABLE SURFACE

(71) Applicant: Toyota Motor Engineering & Manufacturing North America, Inc., Plano, TX (US)

(72) Inventors: Koray Benli, Ann Arbor, MI (US); Yuyang Song, Ann Arbor, MI (US); Umesh N. Gandhi, Farmington Hills, MI (US); Shinnosuke Shimokawa, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/905,431

(22) Filed: Oct. 3, 2024

(51) Int. Cl.
F15B 15/08 (2006.01)
F03G 7/06 (2006.01)

(52) U.S. Cl.
CPC .......... F15B 15/088 (2013.01); F03G 7/0614 (2021.08)

(58) Field of Classification Search
CPC ............................. F15B 15/088; F03G 7/0614
See application file for complete search history.

(56) References Cited

U.S. PATENT DOCUMENTS

| | | | | |
|---|---|---|---|---|
| 5,079,920 A | * | 1/1992 | Whitehead | .......... F03G 7/06143 |
| | | | | 60/527 |
| 10,405,903 B1 | * | 9/2019 | Biesinger | ............. A61B 17/866 |
| 11,550,385 B2 | | 1/2023 | Severgnini et al. | |
| 11,628,560 B2 | | 4/2023 | Li et al. | |
| 2015/0164772 A1 | * | 6/2015 | Colaco | ..................... A61Q 5/06 |
| | | | | 132/206 |

FOREIGN PATENT DOCUMENTS

| | | |
|---|---|---|
| AU | 2014329788 B2 | 4/2015 |
| CN | 108724166 A | 11/2018 |

OTHER PUBLICATIONS

Deshpande et al., "Origami-Inspired Bi-Directional Soft Pneumatic Actuator with Integrated Variable Stiffness Mechanism," International Conference on Advanced Robotics (ICAR), pp. 417-421, Jul. 2017 (5 pages).
Xiang et al., "Energy absorption of origami inspired structures and materials," Thin-Walled Structures 157 (2020) 107130 (19 pages).

* cited by examiner

*Primary Examiner* — Shafiq Mian

(74) *Attorney, Agent, or Firm* — Christopher G. Darrow; Darrow Mustafa PC

(57) ABSTRACT

A system can include a base and an outer layer defining an outer surface. An actuator can be positioned between the base and outer layer. The actuator can include a body that is inflatable and has a bellows configuration. The actuator is movable between an activated configuration and non-activated configuration by selective inflation or deflation of the body. The actuator being operatively positioned to cause the outer surface to morph when in an activated configuration.

17 Claims, 8 Drawing Sheets

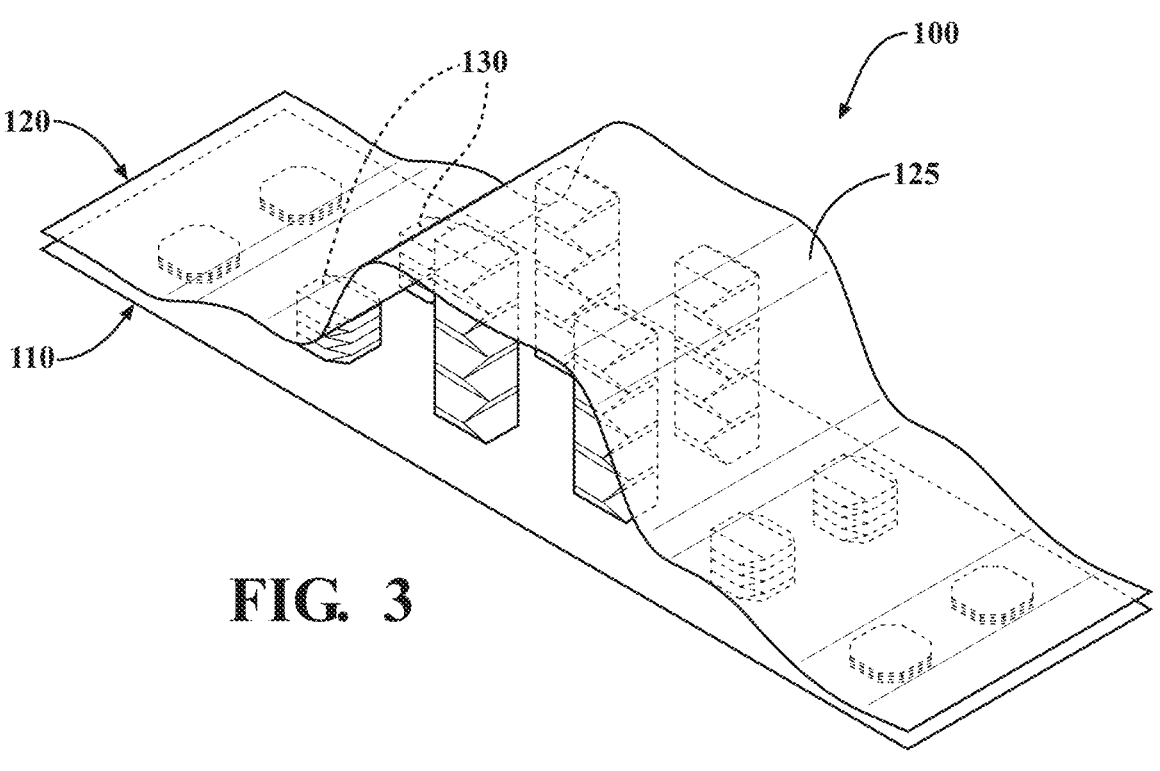
FIG. 3
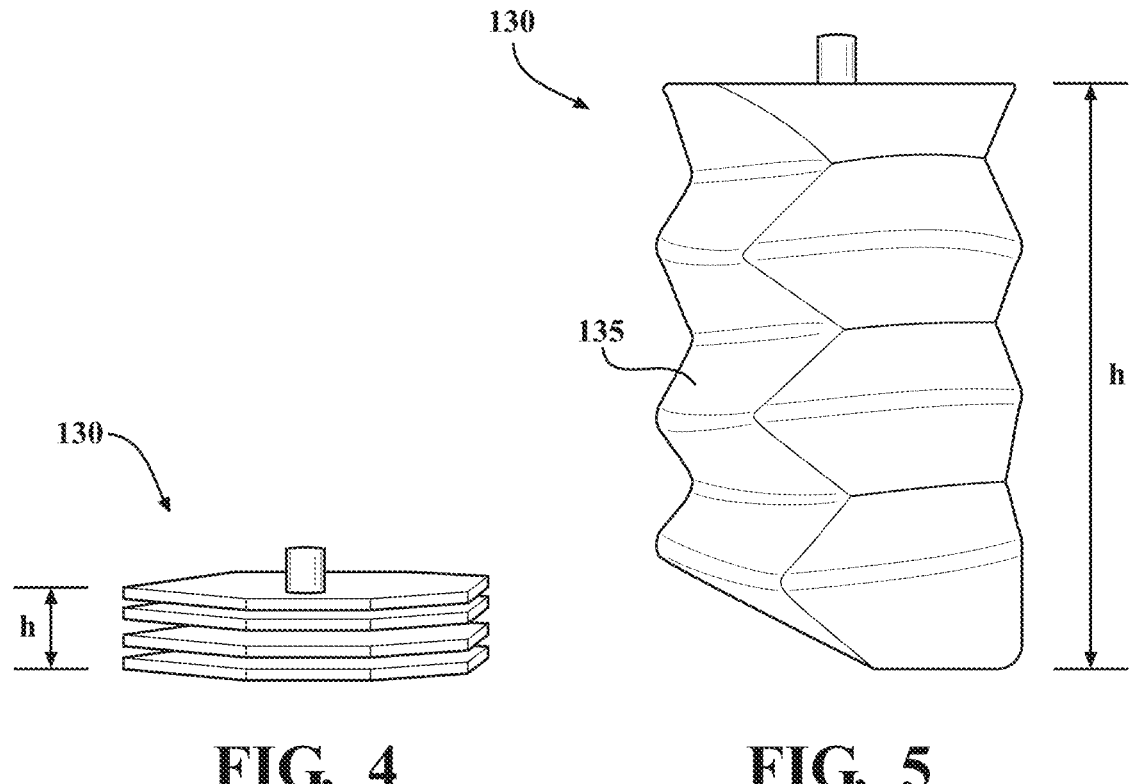
FIG. 4          FIG. 5

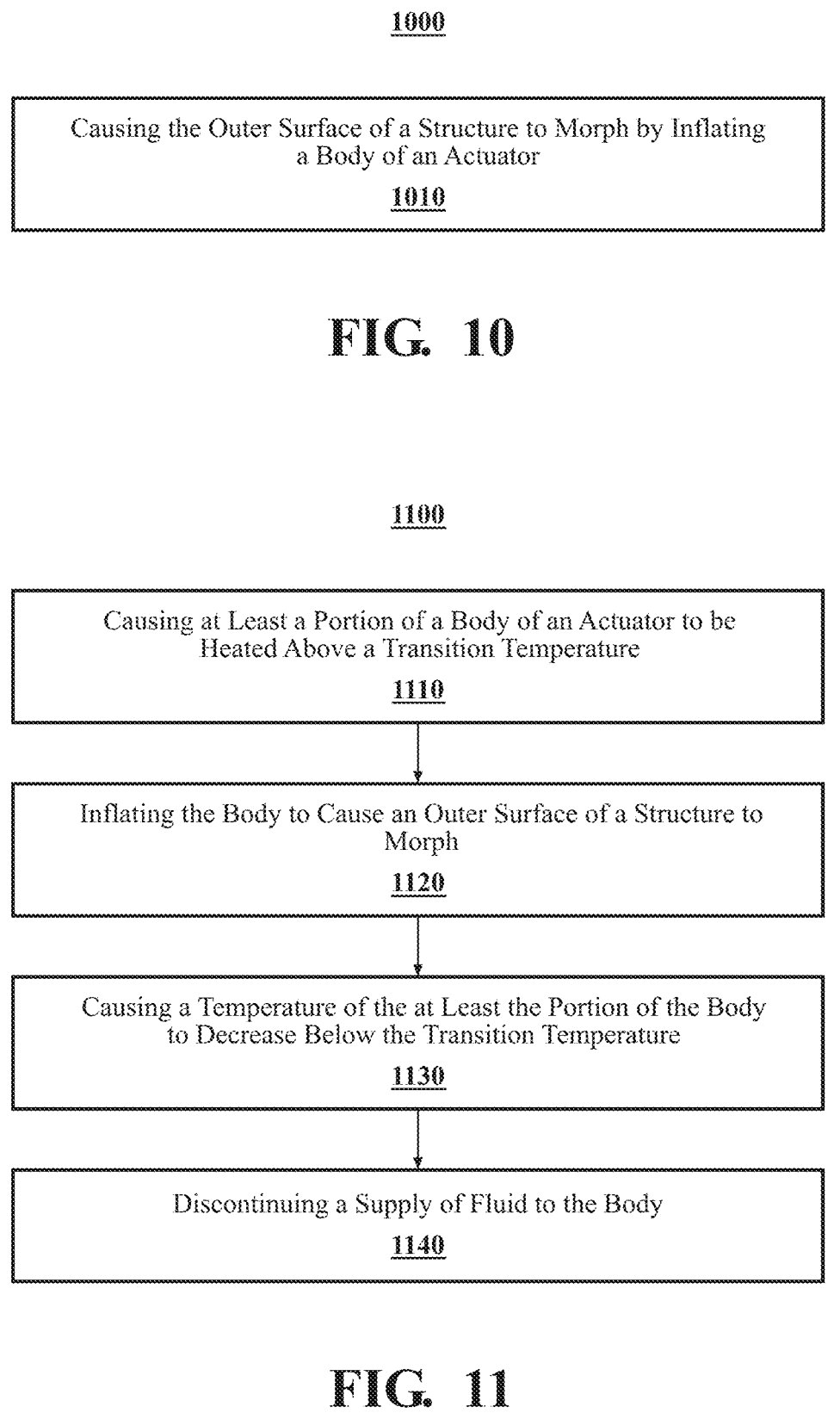

1000

Causing the Outer Surface of a Structure to Morph by Inflating
a Body of an Actuator
1010

Causing at Least a Portion of a Body of an Actuator to be
Heated Above a Transition Temperature
1110

Inflating the Body to Cause an Outer Surface of a Structure to
Morph
1120

Causing a Temperature of the at Least the Portion of the Body
to Decrease Below the Transition Temperature
1130

Discontinuing a Supply of Fluid to the Body
1140

FIG. 11

MORPHABLE SURFACE

FIELD

The subject matter described herein generally relates to surfaces and, more particularly, to selectively morphable surfaces.

BACKGROUND

Linear actuators can provide motion in a straight line when activated. There are several types of linear actuators. For instance, some linear actuators are electromechanical or piezoelectric.

SUMMARY

In one respect, the present disclosure is directed to an actuator. The actuator can include a body that has a bellows configuration and that is inflatable. The body can be made of an active material with a transition temperature. When a temperature of the body is below the transition temperature, the body is rigid. When the temperature of the body is above the transition temperature, the body is flexible. As a result, the actuator is movable between activated and non-activated configurations by selectively inflating or deflating the body.

In another respect, the present disclosure is directed to a system. The system can include a base. The system can include an outer layer defining an outer surface. The system can include an actuator positioned between the base and outer layer. The actuator can include a body that is inflatable and that has a bellows configuration. The actuator can be movable between an activated configuration and non-activated configuration by selective inflation or deflation of the body. The actuator can be operatively positioned to cause the outer surface to morph when in an activated configuration.

In still another respect, the present disclosure is directed to a method. A structure can include an outer layer that defines an outer surface. The structure can include an actuator positioned between a base and outer layer. The actuator can include a body that is inflatable and that has a bellows configuration. The actuator can be movable between a non-activated configuration and one or more activated configurations. The method can include causing the outer surface to morph by inflating the body. As a result, a dimension of the body increases.

BRIEF DESCRIPTION OF THE DRAWINGS

FIG. 3 is an example of the morphable surface of FIG. 1, showing a second example of an activated configuration.

FIG. 4 is an example of an actuator, showing a non-activated configuration.

FIG. 5 is an example of the actuator of FIG. 4, showing an activated configuration.

FIG. 10 is an example of a method.

FIG. 11 is an example of a method.

DETAILED DESCRIPTION

Figure 1:
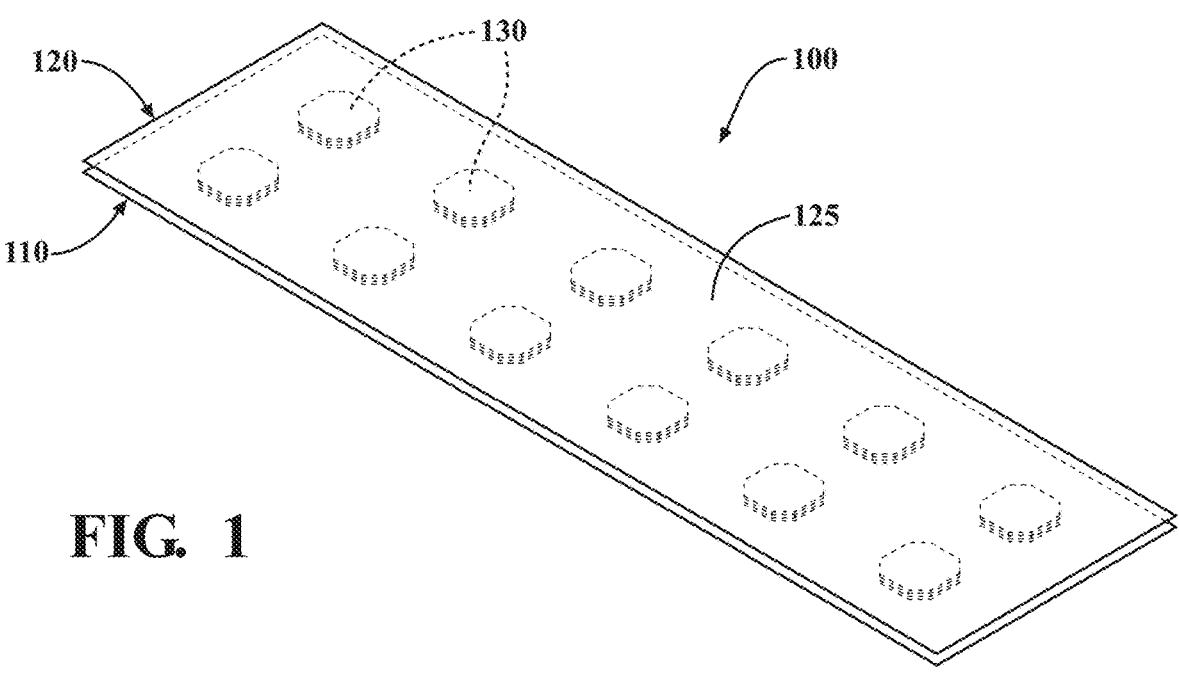
FIG. 1 is an example of a morphable surface, showing a non-activated configuration.

There are several types of linear actuators (e.g., electro-mechanical, piezoelectric) that can provide motion in a straight line when activated. However, many linear actuator designs provide limited stroke in comparison to their initial retracted state. Many of these actuators require additional mechanisms and are not compact in size, which can make their integration into to existing systems (e.g., automobiles) difficult.

According to arrangements described herein, one or more actuators can be operatively positioned to cause an outer surface of a structure to morph. The actuator(s) can include a body that is inflatable and that has a bellows configuration. The actuator(s) can be movable between an activated configuration and non-activated configuration by selective inflation or deflation of the body. Such arrangements can allow a surface to be transformed into targeted three dimensional shapes in a repetitive fashion.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
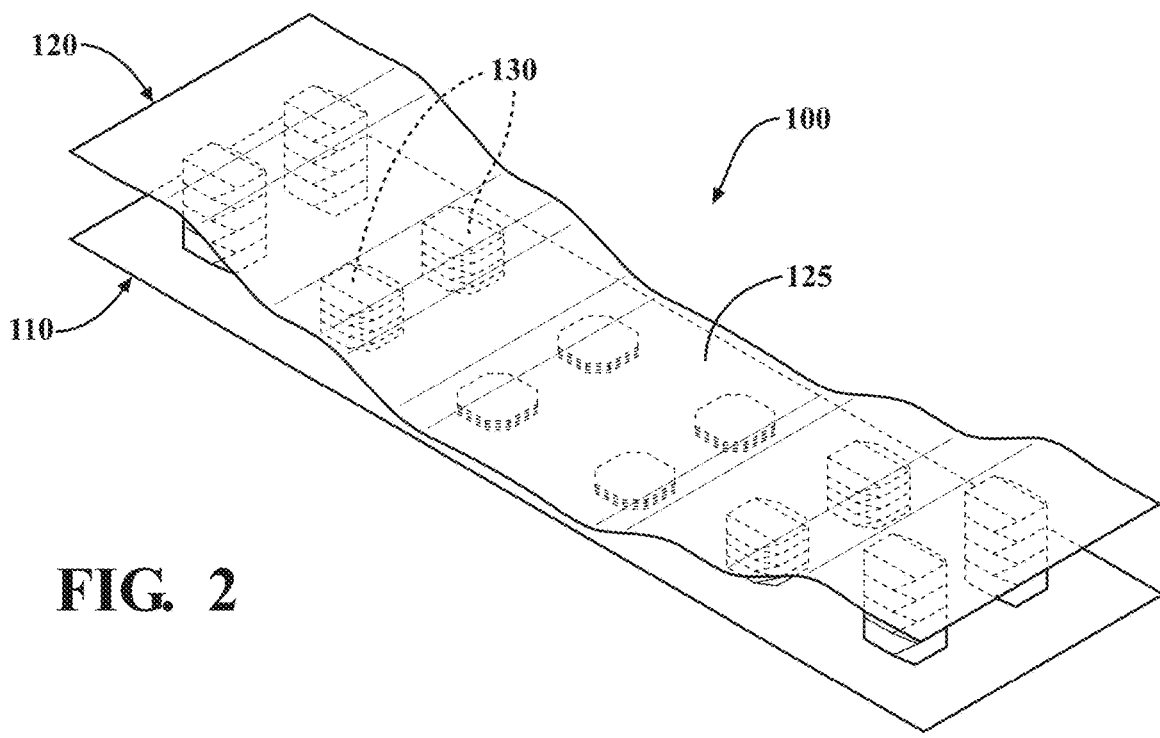
FIG. 2 is an example of the morphable surface of FIG. 1, showing a first example of an activated configuration.

Referring to FIGS. 1-3, an example of a morphable structure 100 is shown. The morphable structure 100 can include a base 110 and an outer layer 120. A plurality of actuators 130 can be operatively positioned between the base 110 and the outer layer 120. The outer layer 120 can define an outer surface 125. According to arrangements herein, the outer surface 125 is morphable.

The morphable structure 100 is shown as being substantially rectangular in shape, but it will be appreciated that the morphable structure 100 is not limited to any particular shape. Indeed, the morphable structure 100 can be substantially circular, substantially polygonal, or irregular in shape, just to name a few possibilities. Further, while FIG. 1 only shows one surface of the morphable structure 100 being a morphable surface. However, it will be appreciated that the morphable structure 100 can have a plurality of morphable surfaces.

The outer layer 120 and the base 110 can be spaced from each other, as shown in FIG. 1. In some arrangements, the morphable structure 100 can be a closed structure. Thus, the sides of the morphable structure 100 can be closed in any suitable manner. For instance, the outer layer 120 can be operatively connected to the base 110 by one or more fasteners, one or more adhesives, one or more forms of mechanical engagement, one or more forms of heat sealing, one or more forms of bonding (e.g., ultrasonic bonding), and/or any combination thereof. In some arrangements, there can be another piece of material joining the base 110 and the outer layer 120.

The base 110 can be made of any suitable material. In some arrangements, the base 110 can be made of a rigid material. The base 110 can be a stable structure to which the actuators 130 can be operatively connected. In some arrangements, when one or more actuators 130 are activated or deactivated, the base 110 does not substantially move and/or deform. Thus, when activated, the actuators 130 can extend in one or more directions away from the base 110.

The outer layer 120 can be made of a deformable, flexible, and/or compliant material. For instance, the outer layer 120 can be made of a plastic, metal, fabric, etc. However, it will be appreciated that the outer layer 120 can be made of any suitable material that can be morphed by one or more of the actuators 130.

When the morphable structure 100 is in a non-activated configuration, the outer surface 125 can be substantially planar or substantially flat. When the morphable structure 100 is in an activated configuration, the outer surface 125 can become non-planar or non-flat. The outer surface 125 can include complex surface contours. In some arrangements, in the activated configuration, the outer surface 125 can be substantially planar or substantially flat but located farther away from the base 110 than in the non-activated configuration.

The actuator(s) 130 can be configured to, when activated, morph into one or more activated configurations in which one or more dimensions of the actuator(s) 130 changes. For example, when going from a non-activated state to an activated state, a height of the actuator(s) 130 can increase. The morphing of the actuator(s) 130 can, in turn, cause a deformation of the outer layer 120 and the outer surface 125. Thus, the shape of the outer layer 120 and the outer surface 125 can be controlled by actuation of one or more of the actuators 130.

The plurality of actuators 130 can be substantially identical to each other. However, one or more of the actuators 130 can be different from the rest of the actuators 130 in one or more respects, such as size, shape, configuration, direction(s) of actuation, activated configuration, and/or material, just to name a few possibilities.

FIGS. 1-3 shows an example of a 2×6 array of actuators 130. However, it will be appreciated that arrangements described herein are not limited in this manner. Indeed, there can be any quantity of the actuators 130. It will be appreciated that the greater the number of actuators 130, the greater complexity and control of shapes of the outer surface 125 can be achieved.

Further, the actuators 130 can be arranged in any suitable manner. In one or more arrangements, the plurality of actuators 130 can be arranged in an array or matrix. In such case, the actuators 130 can form one or more columns and/or one or more rows. In some arrangements, one or more of the actuators 130 can be offset from the other actuators. In some arrangements, the actuators 130 can be arranged randomly. In some arrangements, the spacing between the actuator(s) 130 can be substantially uniform. However, in other arrangements, there may be a non-uniform spacing between the actuator(s) 130, across the entire outer surface 125 or in one or more local areas. In some instances, there can be one or more regions with a greater concentration of actuators 130 compared to other regions.

The actuator(s) 130 can be operatively connected to the base 110 and/or the outer layer 120. Any suitable manner of operatively connection can be implemented, such as one or more adhesives, one or more forms of heat sealing, one or more forms of mechanical engagement, one or more fasteners, one or more forms of bonding, or any combination thereof. One end of the actuator(s) 130 can be operatively connected to the base 110, and another end of the actuator(s) 130 can be operatively connected to the outer layer 120.

The actuators 130 can be configured for individual operation. Thus, the shape, size, and/or location of the deformation of the outer layer 120 can be controlled. Various other suitable arrangements are possible.

FIG. 1 shows an example of the outer surface 125 of the morphable structure 100 in a non-activated mode. All of the actuators 130 are in a non-activated state. In such case, the outer surface 125 can be substantially flat or in some other initial configuration.

The outer surface 125 can go from a non-activated configuration (FIG. 1) to one or more activated configurations (FIGS. 2-3) when one or more of the actuators 130 is activated. Thus, the outer surface 125 can be morphable or transformable by the actuators 130. As an example, FIG. 2 shows an example of an activated configuration in which the actuators 130 near the longitudinal end regions of the morphable structure 100 are fully activated and the actuators 130 in the central region of the morphable structure 100 are non-activated. In between these regions, the actuators 130 can be partially activated. As a result, the contour of the outer surface 125 can change in accordance with the actuation and/or non-actuation of the actuators 130. Any desired contour can be achieved. It will be appreciated that the contour can be relatively simple to highly complex including multi-curvature surfaces.

FIG. 3 shows another example of an activated configuration in which the actuators 130 in the central region are fully activated and the actuators 130 near the longitudinal end regions of the morphable structure 100 are non-activated. In between these regions, the actuators 130 can be partially activated. As a result, the contour of the outer surface 125 can again change. The resultant contour of the outer surface 125 in FIG. 3 is different from the contour of the outer surface 125 in FIG. 2.

It will be appreciated that the individual actuators 130 can be pressurized to different levels to achieve a desired variation in the outer surface 125. The rate of the actuation motion each actuator 130 provides can be determined as a function of the pressure introduced to the actuator 130.

When all actuators 130 are deactivated, the outer layer 120 can substantially return to the initial state. It will be appreciated that the actuators 130 can readily move between activated and non-activated configurations. Further, the actuators 130 can move between different activated configurations. By controlling the deployment of the actuators 130, individually or collectively, different configurations of the outer surface 125 can be achieved.

The actuators 130 can have any suitable configuration. Referring to FIGS. 4-5, a first example of an actuator 130 is shown. The actuator 130 can have a body 132. The body 132 can be made of any suitable material. For instance, in some arrangements, the body 132 can be made of a flexible, pliable, stretchable, and/or compliant material. The material can be fluid tight or airtight. As an example, the material can be an airtight fabric. The body 132 can be relatively thin. The body 132 can be made of a durable material. In one or more arrangements, the body 132 can be made of an elastomeric material. In one or more arrangements, the body 132 can be made of thermoplastic polyurethane (TPU). In one or more arrangements, the body 132 can be made of fabric. In one or more arrangements, the body 132 can be made of fabric coated with a plastic sheet. The body 132 can be formed in any suitable manner. In some arrangements, the body 132 can be formed by fused deposition modeling (FDM) 3D printing.

The actuator 130 can have a bellows configuration. Thus, the actuator 130 can be selectively expanded or collapsed, such as in any accordion-like, origami-like, or bellows-like manner, now known or later developed. In some arrangements, the body 132 can include one or more folds, creases, patterns, or can otherwise be concertinaed, thereby allowing the body 132 to be expanded and collapsed.

The body 132 can include an outer surface 135. The outer surface 135 can define at least a portion of the exterior of the actuator 130. The body 132 can be at least partially hollow. Thus, the body 132 can have an inner chamber.

In some arrangements, the inner chamber can be substantially fluid impermeable. In such case, the body 132 can be inflated with a fluid and can retain the fluid without allowing the fluid to escape through the material of the body 132. In some arrangements, the body 132 can be made of a material that is fluidly impermeable. In some arrangements, the body 132 can be made of a material that is not fluidly impermeable; however, a fluidly impermeable member, such as a balloon, sleeve, or lining can be received within the body 132. The sleeve can be made of any suitable material, such as a plastic or fabric material. The fluidly impermeable member can stretch when inflated. In some arrangements, the body 132 can be made of a material that is not fluidly impermeable; however, a coating can be applied to the body 132 to make the body 132 fluidly impermeable.

In one or more arrangements, the body 132 can be configured to be inflatable. Thus, in some arrangements, the body 132 can include one or more inlets, ports, or valves to allow air or other fluid to be delivered to and/or released from the inner chamber or the fluidly impermeable member. The body 132 can be operatively connected to a fluid source. The inner chamber or the fluidly impermeable member can be sealable to retain a fluid therein.

The body 132 can have any suitable size, shape, and/or configuration. In some arrangements, the body 132 can be substantially rectangular prismatic or substantially cylindrical when not inflated, as s shown in FIG. 4. In some arrangements, the body 132 can be substantially rectangular prismatic or substantially cylindrical when inflated, as is shown in FIG. 5. However, it will be appreciated that other shapes are possible.

The actuator 130 can have a non-activated configuration and one or more activated configurations. Examples of each of these configurations will be described in turn below.

FIG. 4 shows an example of a non-activated configuration of the actuator 130. In such case, a fluid is not provided to the inner chamber. Thus, the body 132 is in a neutral or non-activated configuration. FIG. 5 shows an example of the actuator 130 in an activated configuration. It will be appreciated that FIG. 5 is merely one example of an activated configuration, as the actuator 130 can have a plurality of activated configurations. A pressurized fluid can be supplied to the inner chamber to cause the actuator to morph into the activated configuration. In the particular arrangement of FIGS. 4-5, the actuator 130 can provide a linear stroke more than 10 times of its initial non-activated state when inflated. For instance, in some arrangements, a height of the actuator 130 in a non-activated state can be about 12 mm, and the height of the actuator 130 can be about 140 mm when inflated. In some arrangements, the actuator 130 can be configured to hold a pressurized fluid of at least about 10 psi, at least about 20 psi, at least about 30 psi, at least about 40 psi, at least about 50 psi, at least about 60 psi, at least about 70 psi, or at least about 80 psi without failure. The stroke amount of the actuator 130 can be controlled as a function of the pressure of the fluid supplied to the inner chamber of the actuator 130.

While the particular actuator 130 shown in FIGS. 4-5 is a linear actuator, it will be appreciated that arrangements described herein are not limited to linear actuators. The actuator 130 can be configured to provide non-linear modes of actuation when inflated. Such non-linear modes of actuation can be achieved by the configuration of the body 132 of the actuator 130.

In some arrangements, the degree of actuation of the actuator 130 can be controlled by the amount of fluid supplied to the inner chamber of the actuator 130 and/or the pressure of the fluid supplied to the inner chamber. For instance, in some arrangements, a sufficient amount and/or pressure of fluid can be supplied to the inner chamber to cause the actuator 130 to actuate to an activated configuration that is less than a fully activated configuration. In such case, the actuator 130 may not fully extend.

Figure 6:
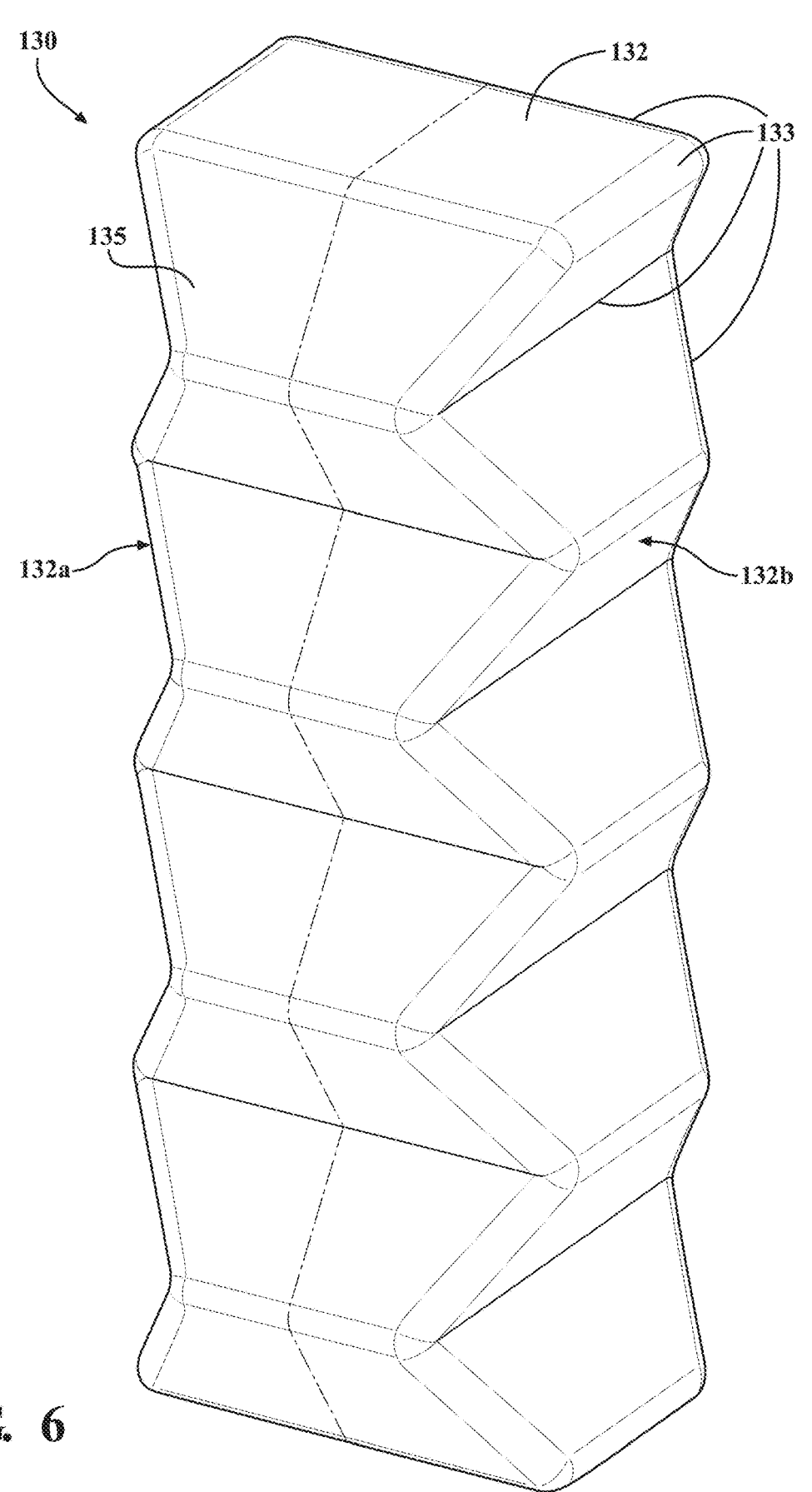
FIG. 6 is an example of an actuator.
Figure 7:
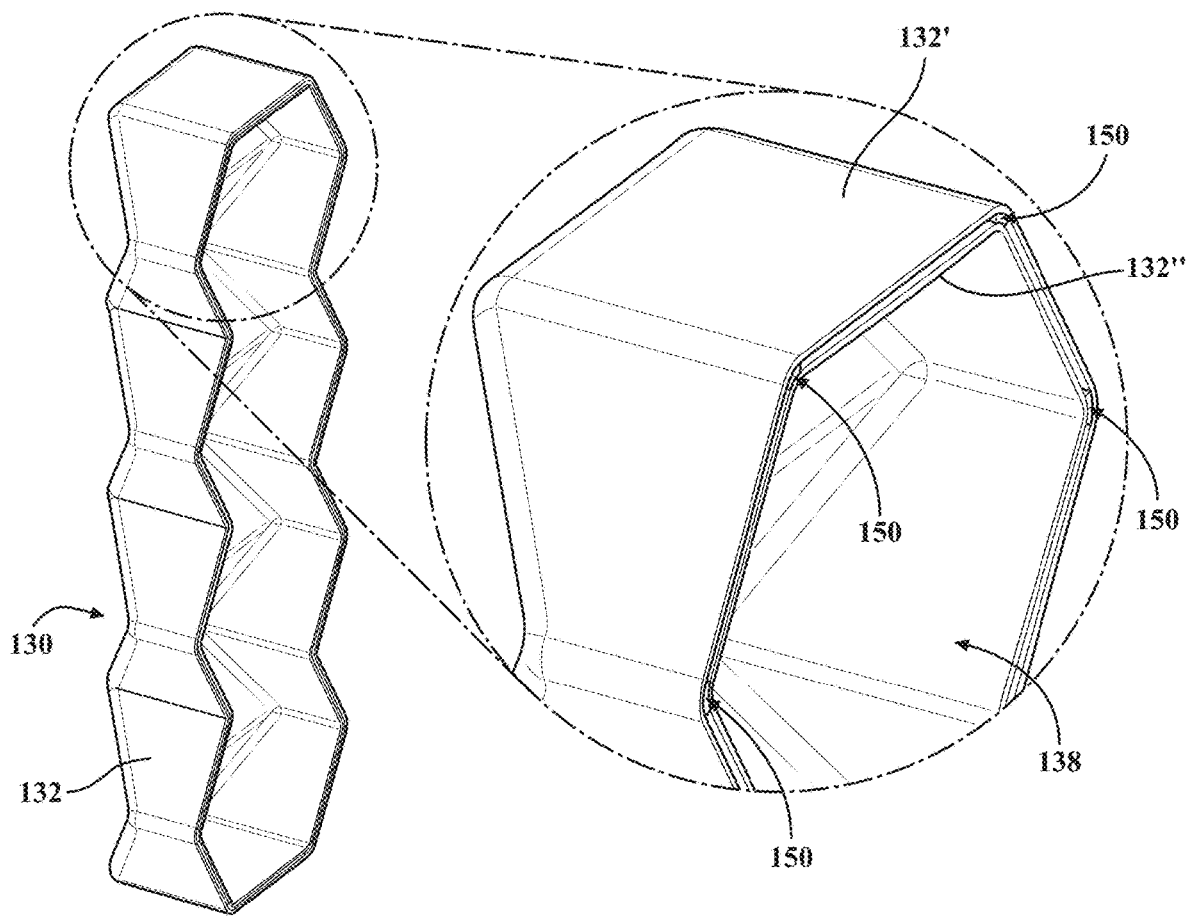
FIG. 7 is an example of a portion of the actuator of FIG. 6.
Figure 8:
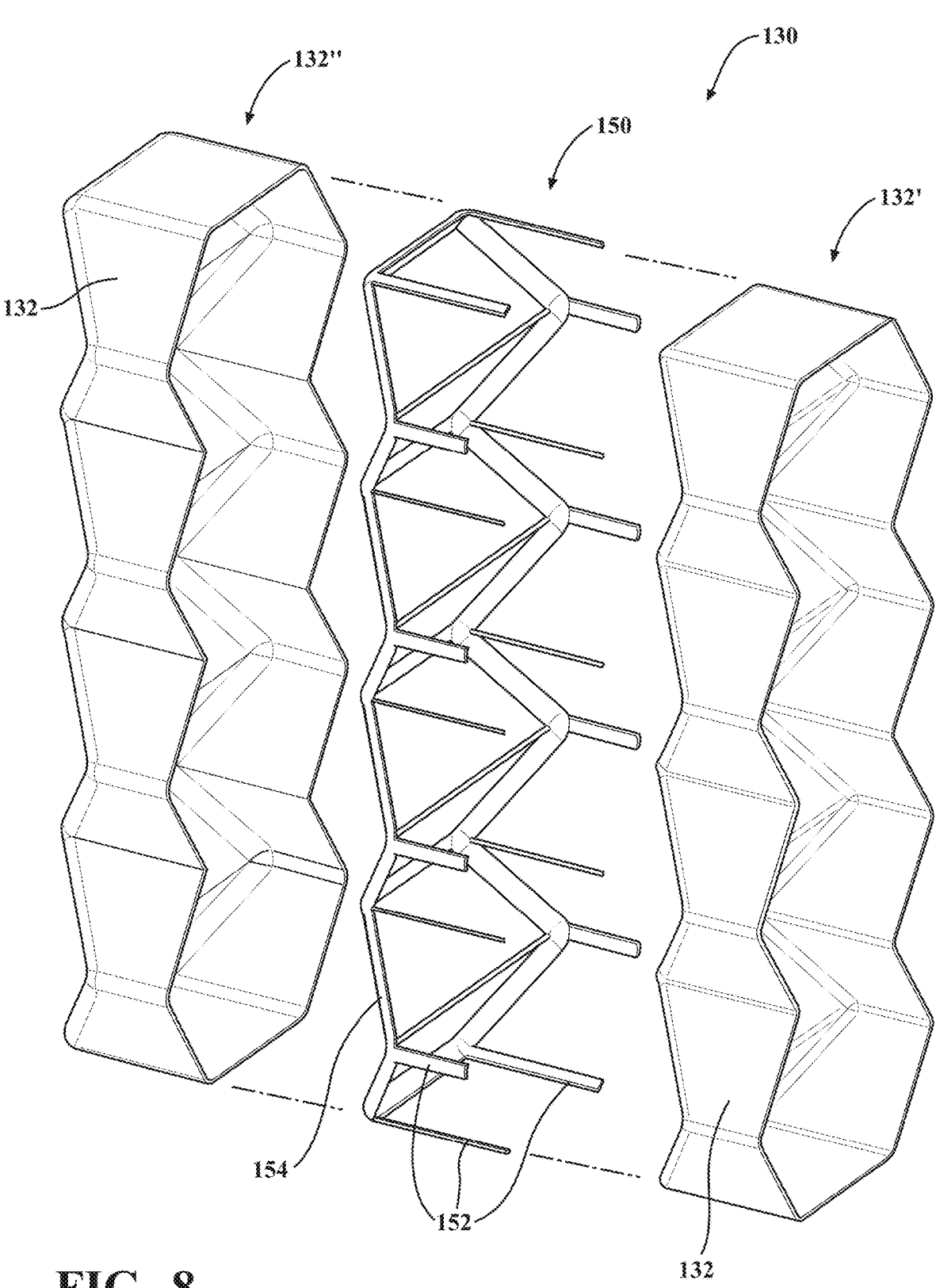
FIG. 8 is an exploded view of the actuator of FIG. 6.

Referring to FIGS. 6-8, a second example of the actuator 130 is shown. The actuator 130 can have a bellows configuration, as described above. In this example, at least a portion of the body 132 of the actuator 130 can be made of an active material. The active material can be any material or composition that, when activated, one or more properties of the material changes from an initial state. And, when deactivated, the one or more properties of the material can revert back to the initial state. One example of an active material is a shape memory polymer (SMP).

The active material can have a transition temperature or glass transition temperature. When the temperature of the active material is below the transition temperature, the active material can be rigid. When the temperature of the active material is at or above the transition temperature, the active material can become flexible, deformable, and/or elastic. The transition temperature can be chemically tailored to achieve a desired transition temperature.

For instance, in a non-activated condition, the active material can be rigid. When the material is rigid, the actuator 130 does not extend from its current configuration when a pressurized fluid is supplied to an inner chamber 138 of the body 132. In one particular example, when the material is rigid, the actuator 130 does not extend from its current configuration when a pressurized fluid is supplied to the inner chamber 138 at about 10 psi or less, at about 20 psi or less, at about 30 psi or less, at about 40 psi or less, about 50 psi or less, about 60 psi or less, about 70 psi or less, or about 80 psi or less.

In an activated condition, the active material can become flexible. As a result, the actuator 130 can extend from its current configuration when a fluid is supplied to the inner chamber 138. In one particular example, when the material is flexible, the actuator 130 can extend from its current configuration even when a pressurized fluid is supplied to the inner chamber 138 at about 10 psi or less, at about 20 psi or less, at about 30 psi or less, at about 40 psi or less, about 50 psi or less, about 60 psi or less, about 70 psi or less, or about 80 psi or less. Alternatively or additionally, when the active material is flexible, the actuator 130 can retract from its current configuration when a fluid is drawn out of the inner chamber 138 or under its own weight.

An activation input can be provided to the active material to cause its temperature to be adjusted. In some arrangements, the activation input can cause the temperature of the active material to increase such that the active material is in the activated condition. The activation input can be discontinued to the active material to cause it to be in the non-activated condition. In some arrangements, the activation input can be heat. The active material can be heated in any suitable manner, now known or later developed. For instance, the active material can be heated by using a heating element, directing hot air or other fluid on the active material, and/or by the Joule effect by passing electrical current through it.

The body 132 can be made in one or more parts. FIG. 6 shows an example in which the body 132 includes a first portion 132a and a second portion 132b. In such case, the first portion 132a can be operatively connected to the second portion 132b to form the actuator 130. However, in other arrangements, the body 132 can be a single piece of material.

The actuator 130 can be configured to enable to active material of the body 132 to be heated. For instance, the actuator 130 can include one or more heating elements 150. The heating element(s) 150 can be any suitable type of heating element, now known or later developed. In one or more arrangements, the heating element(s) 150 can be a conductive material. For instance, the conductive material can be provided in any suitable form, such as a strip, a bar, a block, a cylinder, a wire, a layer, a coating, a screen, or a mesh, just to name a few possibilities.

In one or more arrangements, one or more heating elements 150 can be operatively connected to the body 132. The heating element(s) 150 can be operatively positioned in contact with the body 132. In some arrangements, the heating element(s) 150 can be located on an exterior of the body 132. In some arrangements, the heating element(s) 150 can be located on an interior of the body 132. In still other arrangements, the heating element(s) 150 can be embedded in the body 132. In such case, the heating element(s) 150 can be encapsulated by the body 132.

The heating element(s) 150 can be distributed in any suitable manner relative to the body 132. In some arrangements, the heating element(s) 150 can be located along one or more edges 133 of the body 132.

In some arrangements, the heating element(s) 150 can be operatively positioned to selectively cause the body 132 to be heated. For instance, the heating element(s) 150 can be spaced from the body 132 such that there is no direct contact between them.

FIGS. 7-8 show an example in which the heating elements 150 are embedded within the body 132. Of course, it will be appreciated that this is merely one manner in which operative connection between the heating elements 150 and the body 132 can be achieved. The body 132 can include an inner portion 132' and an outer portion 132". The heating element(s) 150 can be sandwiched between the inner portion 132' and an outer portion 132".

FIG. 8 shows an exploded view of a portion of the actuator 130. The heating element(s) 150 can be provided as a frame like structure including transverse elements 152 that extend in a direction that is transverse to the direction of expansion of the actuator 130. In some arrangements, the transverse elements 152 can be substantially parallel to each other. Further, the structure can include one or more in line elements 154 that generally extend in a direction of expansion of the actuator 130. In this arrangements, the transverse elements 152 and the in line elements 154 can be a single structure. In such an arrangements, the entire heating structure can be heated at substantially the same time. However, it will be appreciated that, in other arrangements, the heating elements can be provided as a plurality of individual elements that are physically separated from each other and that are not electrically connected to each other. Such an arrangement can enable selective parts of the body 132 to be heated.

In some arrangements, the heating elements 150 can be made of a material that is deformable, compliant, and/or flexible. Thus, as the actuator 130 expands or contracts, the heating elements 150 can conform to the changes. The heating elements 150 do not interfere with the movement of the actuator 130. The heating element(s) 150 can be made of a material that can be heated or that can generate heat in response to an input. In some arrangements, the heating element(s) 150 can be operatively connected to an energy source (see, e.g., energy source(s) 950 in FIG. 9).

The actuator 130 shown in FIGS. 6-8 can have a non-activated configuration and one or more activated configurations, similar to what is shown in FIGS. 4 and 5. It will be appreciated that FIGS. 6-8 show merely one example of an activated configuration. A pressurized fluid can be supplied to the inner chamber 138 to cause the actuator to morph into the activated configuration. In some arrangements, the actuator 130 can be configured to hold a pressurized fluid of at least about 10 psi, at least about 20 psi, at least about 30 psi, at least about 40 psi, at least about 50 psi, at least about 60 psi, at least about 70 psi, or at least about 80 psi without failure.

In some arrangements, the actuator 130 can provide a linear stroke more than 10 times of its initial non-activated state when inflated. The stroke amount of the actuator 130 can be controlled as a function of the pressure of the fluid supplied to the inner chamber 138 and/or state of the material of the body 132. While the particular actuator 130 shown in FIGS. 6-8 is a linear actuator, it will be appreciated that arrangements described herein are not limited to linear actuators. The actuator 130 can be configured to provide non-linear modes of actuation when inflated. Such non-linear modes of actuation can be achieved by the configuration of the body 132 of the actuator 130.

Also, it will be appreciated that different arrangements of the actuator 130 with an active material are possible. As an example, the body 132 of the actuator 130 can be made of an active material, but the actuator 130 does not include the heating elements 150. In such case, hot air or a hot gas can be directed toward the body 132 (or portions of the body 132) to raise its temperature to or above the transition temperature, thereby placing the actuator 130 in a flexible or soft state in which its configuration can change.

As another example, hinge or edge regions of the body 132 can be made of an active material, and the other portions of the body 132 can be made of a non-active material (e.g., thermoplastic polyurethane (TPU), acrylonitrile butadiene styrene (ABS), polypropylene (PP), or other suitable thermoplastic). The hinge or edge regions of the body 132 may or may not include the heating elements 150. Thus, in this configuration, the active material portions of the body 132 are heated to enable the actuator 130 to change configuration.

Once the hinge or edge regions of the actuator 130 are in an activated or soft state, pressurized fluid can be introduced to the inner chamber 138 of the actuator. As a result, the hinge or edge regions in an activated or soft state are not able to resist the increasing pressure, causing the actuator 130 to elongate. In contrast, an actuator 130 with hinge or edge regions in a non-activated or rigid state remains contracted and are not affected by the pressure of the fluid supplied to the inner chamber 138 of the actuator 130. Such operation can be sequentially repeated until the desired target shape transformation is obtained.

Figure 9:
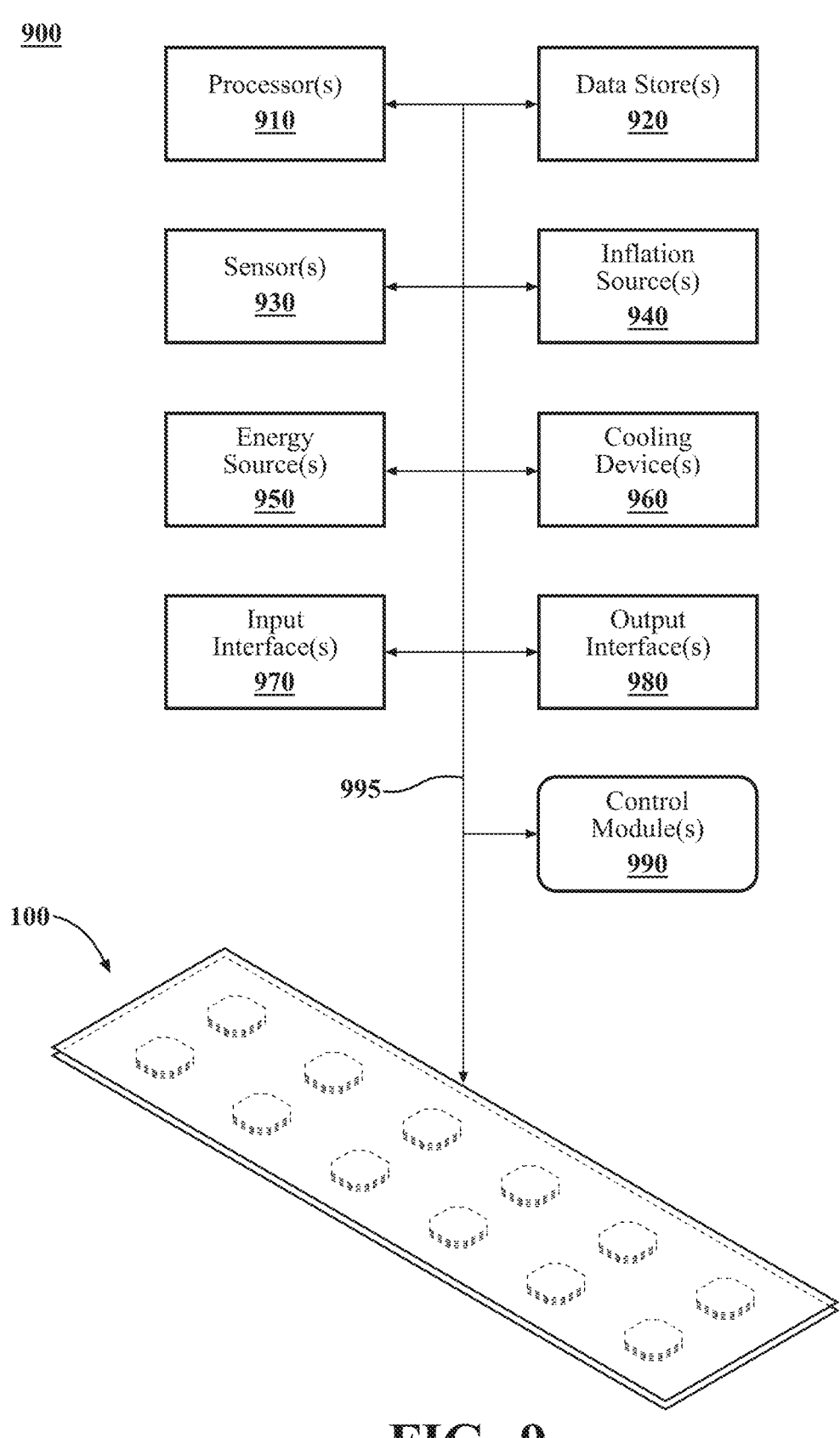
FIG. 9 is an example of a system.

Referring to FIG. 9, an example of a system 900 is shown. The system 900 can include various elements. Some of the possible elements of the system 900 are shown in FIG. 9 and will now be described. It will be understood that it is not necessary for the system 900 to have all of the elements shown in FIG. 9 or described herein. The system 900 can have any combination of the various elements shown in FIG. 9. Further, the system 900 can have additional elements to those shown in FIG. 9. In some arrangements, the system 900 may not include one or more of the elements shown in FIG. 9. Further, the elements shown may be physically separated by large distances. Indeed, one or more of the elements can be located remote from the other elements of the system 900.

The system 900 can include the morphable structure 100. The above description of the morphable structure 100 applies equally here. The system 900 can include one or more processors 910, one or more data stores 920, one or more sensors 930, one or more inflation sources 940, one or more energy sources 950, one or more cooling device(s) 960, one or more input interfaces 970, one or more output interfaces 980, and one or more control modules 990. Each of these elements will be described in turn below.

The system 900 can include one or more processors 910. "Processor" means any component or group of components that are configured to execute any of the processes described herein or any form of instructions to carry out such processes or cause such processes to be performed. The processor(s) 910 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 910 can include at least one hardware circuit (e.g., an integrated circuit) configured to carry out instructions contained in program code. In arrangements in which there is a plurality of processors 910, such processors can work independently from each other or one or more processors can work in combination with each other.

The system 900 can include one or more data stores 920 for storing one or more types of data. The data store(s) 920 can include volatile and/or non-volatile memory. Examples of suitable data stores 920 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 920 can be a component of the processor(s) 910, or the data store(s) 920 can be operatively connected to the processor(s) 910 for use thereby. The term "operatively connected," as used throughout this description, can include direct or indirect connections, including connections without direct physical contact.

The data store(s) 920 can store one or more actuation profiles for the morphable structure 100. The actuation profiles can represent different presets to create a desired morphed state of the morphable structure 100. The actuation profiles can include instructions for activating one or more of the actuators 130 in a specified manner. The actuation profiles can include activation patterns, activation sequences, activation zones, activation regions, activation times, activation duration, degree of actuation, actuation cycles, etc. for individual actuators 130 and/or any grouping of the actuators 130. The actuation profiles can be created by an end user, a seat manufacturer, a vehicle manufacturer, or some other entity. In some instances, one or more actuation profiles can be received from a remote source.

The data store(s) 920 can include material property data about the body of the actuator(s) 130. The material data can include the transition temperature or glass transition temperature of the material of the body 132. The material data can include graphs, tables, charts, or other data about the material properties of the material of the body 132 at different temperatures.

The system 900 can include one or more sensors 930. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 900 includes a plurality of sensors 930, the sensors can work independently from each other. Alternatively, two or more of the sensors can work in combination with each other. In such case, the two or more sensors can form a sensor network. The sensor(s) 930 can be operatively connected to the processor(s) 910, the data store(s) 920, and/or other elements of the system 900 (including any of the elements shown in FIG. 1).

The sensor(s) 930 can include any suitable type of sensor, now known or later developed. In some arrangements, the sensor(s) 930 can be configured to acquire data about the body 132. For instance, the sensor(s) 930 can be configured to acquire sensor data about a temperature of the body 132 of the actuator(s) 130, overall or in one or more localized areas. Thus, the sensor(s) 930 can include one or more temperature sensors. The temperature sensors can be any type of temperature sensor, now known or later developed.

As another example, the sensor(s) 930 can be configured to acquire sensor data about a pressure within the actuator(s) 130. For instance, the sensor(s) 930 can be configured to acquire sensor data about a pressure within one or more of the actuators 130. Thus, the sensor(s) 930 can include one or more pressure sensors. The pressure sensors can be any type of temperature sensor, now known or later developed.

The type of sensor may depend on the context in which the system 900 is used. For instance, in some arrangements in which the system 900 is used in the context of a vehicle, the sensor(s) 930 can acquire sensor data about an external environment of a vehicle, sensor data about a vehicle, and/or sensor data about a vehicle occupant. Of course, it will be appreciated that arrangements described herein are not limited to vehicular applications.

The system 900 can include one or more inflation sources 940. The inflation source(s) 940 can be any source of air or other suitable fluid, now known or later developed, for inflating the actuator(s) 130. The fluid can be in gas or liquid form. In some arrangements, the inflation source(s) 940 can include a canister capable of delivering a pressurized gas or liquid. In some implementations, the inflation source(s) 940 can include a pump or other device(s) to facilitate a supply of an inflating fluid to the actuator(s) 130.

In some arrangements, the inflation source(s) 940 can be operatively connected to the actuator(s) 130 by one or more ducts, channels, conduits, tubes, hoses, and/or passages. In some arrangements, the inflation source(s) 940 can be operatively connected to the actuator(s) 130 by one or more fasteners, one or more clamps, and/or one or more couplings. One or more valves can be operatively positioned between the inflation source(s) 940 and the actuator(s) 130. In some arrangements, there can be a single valve regulating the supply of inflating fluid to the plurality of the actuators 130, including a single valve for all of the actuators 130. In some arrangements, there can be a valve for each of the actuators 130. The state of the valves can be controlled by the control module(s) 990. The state of the valves can be controlled (e.g., electronically, mechanically, etc.), allowing fluid to be supplied to individual actuator(s) 130 on demand.

In some arrangements with the actuators 130 shown in FIGS. 4-5, there can be a central inflation source for the actuators 130. In such case, there can be a valve associated with each actuator 130 to enable control over the degree of actuation of each actuator.

In some arrangements with the actuators 130 shown in FIGS. 6-8, there can be a central inflation source for the actuators 130. In such case, valves are not needed as the degree of actuation of each actuator 130 can be controlled by controlling the state of the body of each actuator 130. For instance, if an actuator 130 is to be extended, then the body 132 can be heated to a temperature greater than or equal to its transition temperature. In such case, the body 132 can becomes flexible and can extend when a pressurized fluid is supplied to the actuator 130.

When a desired actuated position is achieved, the body 132 can cool to a temperature below the transition temperature. As a result, the body can become rigid, and there is no longer a need to continue or maintain a supply pressurized fluid to the actuator 130 because its actuated shape can be locked by its own rigidity. Thus, the use of complex valving and/or electromechanical controller systems can be avoided.

On the other hand, if an actuator 130 is to remain in its current position, then the body 132 can remain at a temperature below the transition temperature. Thus, the body 132 can be rigid. As a result, the supply of pressurized fluid to the actuator 130 will not affect the position of the actuator 130.

The inflation source(s) 940 can be operatively connected to the actuator(s) 130 to supply an inflating fluid to an interior of the actuator(s) 130. In some arrangements, the inflation source(s) 940 can be configured to maintain a constant fluid pressure within the actuator(s) 130. In some arrangements, the inflation source(s) 940 can be controlled or configured to cause the actuator(s) 130 to achieve a target degree of actuation.

In some arrangements, the inflation source(s) 940 can be configured to create suction or a vacuum so as to draw the inflation fluid in the actuator(s) 130. However, in other arrangements, the suction or vacuum can be generated by some other system, device, or component. In some arrangements, the inflating fluid drawn out of the actuator(s) 130 can be drawn back into the inflation source(s) 940. In some arrangements, the inflating fluid drawn out of the actuator(s) 130 can be exhausted to the environment or to some other location.

The system 900 can include one or more energy sources 950. The energy source(s) 950 can be any energy source capable of and/or configured to at least partially power one or more elements of the system 900. For example, the energy source(s) 950 can include one or more batteries, one or more fuel cells, one or more generators, one or more alternators, one or more solar cells, and combinations thereof.

Alternatively or additionally, the energy source(s) 950 can be any energy source capable of and/or configured to heat and/or energize one or more elements of the system (e.g., the material of the body 132 of the actuator(s) 130). The energy source(s) 950 can be operatively connected and/or operatively positioned to supply energy to the body 132 of the actuator(s) 130 and/or to the heating element(s) 150 operatively connected to the body 132 of the actuator(s) 130. In some arrangements, the energy source(s) 950 can supply electrical energy to the heating element(s) 150. In some arrangements, a temperature of at least a portion of the body 132 of the actuator(s) 130 can be increased by supplying hot air to the body 132. In such case, the energy source(s) 950 can include a heater or some other heat source. The heater or other heat source can be operatively positioned with respect to the body 132 or portions thereof.

The system 900 can include one or more cooling devices 960 or cooling sources. The cooling device(s) 960 can be used to facilitate cooling of the body below the transition temperature. The cooling device(s) 960 can include one or more air movement devices (e.g., a fan, blower, or duct), liquids, Peltier cooling or other thermoelectric type cooling, other types of cooling, or any combination thereof. The cooling device(s) 960 can be operatively connected to and/or operatively positioned relative to the body 132 of the actuator(s) 130.

The system 900 can include one or more input interfaces 970. An "input interface" includes any device, component, system, element or arrangement or groups thereof that enable information/data to be entered into a machine. The input interface(s) 970 can receive an input from a user (e.g., a person, a computer, or other entity). Any suitable input interface 970 can be used, including, for example, a keypad, display, touch screen, multi-touch screen, button, joystick, mouse, trackball, microphone, gesture recognition, and/or combinations thereof.

The system 900 can include one or more output interfaces 980. An "output interface" includes any device, component, system, element or arrangement or groups thereof that enable information/data to be presented to a user (e.g., a person) or other entity. The output interface(s) 980 can present information/data to a user or other entity. The output interface(s) 980 can include a display, an earphone, haptic device, and/or speaker. Some components of the system 900 may serve as both a component of the input interface(s) 970 and a component of the output interface(s) 980.

The system 900 can include one or more modules, at least some of which will be described herein. The modules can be implemented as computer readable program code that, when executed by a processor, implement one or more of the various processes described herein. One or more of the modules can be a component of the processor(s) 910, or one or more of the modules can be executed on and/or distributed among other processing systems to which the processor (s) 910 is operatively connected. The modules can include instructions (e.g., program logic) executable by one or more processor(s) 910. Alternatively or in addition, one or more data stores 920 may contain such instructions.

The system 900 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 900 can include one or more control modules 990. The control module(s) 990 can include profiles and logic for actively controlling the morphable structure 100 according to arrangements herein. The control module(s) 990 can be configured to determine when and/or how the morphable structure 100 should be morphed. The control module(s) 990 can be configured to do so in any suitable manner. For instance, the control module(s) 990 can be configured to analyze data or information acquired by the sensor(s) 930. Alternatively or additionally, the control module(s) 990 can be configured to detect user inputs (e.g., commands or other inputs indicative of activating or deactivating the morphable structure 100) provided on the input interface(s) 970. For instance, a user can provide an input on the input interface(s) 970. The input can be to activate or deactivate the morphable structure 100. The control module(s) 990 can be configured to cause the appropriate actuators 130 to be deactivated or activated in accordance with the user input. The control module(s) 990 can retrieve raw data from the sensor(s) 930 and/or from the data store(s) 920. The control module(s) 990 can use profiles, parameters, or settings loaded into the control module(s) 990 and/or stored in the data store(s) 920.

The control module(s) 990 can be configured to selectively activate and deactivate one or more of the actuators 130. The control module(s) 990 can be configured to control a degree of activation of one or more of the actuators 130. By selectively activating the actuator(s) 130 and/or controlling a degree of activation of the actuator(s) 130, the control module(s) 990 can cause the outer surface 125 of the morphable structure 100 to morph into an activated configuration.

In some arrangements, the control module(s) 990 can be configured to activate the actuator(s) 130 by selectively inflating individual actuators 130 and/or groups of actuators 130. In such case, the control module(s) 990 can allow or stop a supply of inflating fluid from the inflation source(s) 940. The control module(s) 990 can do so by sending command signals to the inflation source(s) 940 or one or more valves operatively positioned between the inflation source(s) 940 and the actuator(s) 130.

In some arrangements, the control module(s) 990 can be configured to activate the actuator(s) 130 by selectively heating and selecting inflating individual actuators 130 and/or groups of actuators 130. In such case, the control module(s) 990 can allow or stop a supply of inflating fluid from the inflation source(s) 940. The control module(s) 990 can do so by sending command signals to the inflation source(s) 940 or one or more valves operatively positioned between the inflation source(s) 940 and the actuator(s) 130. Further, the control module(s) 990 can cause a heating or cooling of the material of the body of the actuator(s) 130. For instance, the control module(s) 990 can cause one or more heating elements 150 of individual actuators 130 to be heated by energizing the heating element(s) with energy from the energy source(s) 950. The control module(s) 990 can cause hot air from a heater or other heat source to be directed toward individual actuators 130.

In one or more arrangements, the control module(s) 990 can cause at least a portion of the body 132 of an actuator 130 to be heated above a transition temperature. In this state, the actuator 130 can be inflated because the material of the body 132 can become viscous, rubbery, soft, and/or compliant. If the actuator 130 is not heated above the transition temperature, the actuator will be in a rigid or hard state. Consequently, supplying an inflating fluid to the actuator 130 in this state will not result in the actuator inflating.

Once the at least a portion of the body 132 of the actuator 130 is heated, the control module(s) 990 can cause the body 132 to be inflated, thereby morphing the actuator 130 into an activated configuration. As a result, the outer surface 125 of the morphable structure 100 morphs.

If the activated position of the actuator 130 is to be maintained, the control module(s) 990 can cause a temperature of the at least a portion of the body 132 to decrease below the transition temperature. The control module(s) 990 can do so by discontinuing the heating of the at least a portion of the body 132 of the actuator 130 and/or by actively cooling the at least a portion of the body 132 of the actuator 130 by activating the cooling device(s) 960. In such case, the body 132 of the actuator 130 can become rigid such that the activated configuration can be maintained without further supply of inflating fluid.

Accordingly, the control module(s) 990 can cause the supply of inflating fluid to the body 132 of the actuator 130 to be discontinued. If the actuator 130 is to return to the non-activated configuration or to a different activated configuration, the control module(s) 990 can heat the at least a portion of the body 132 of the actuator 130 to enable such changes, which can also include supplying inflating fluid to the actuator 130 as described above.

The control module(s) 990 can be configured to control a plurality of the actuators 130. The control module(s) 990 can be configured to control each actuator 130 individually. Thus, the control of one actuator 130 can be independent of the control of the other actuators 130. Alternatively, the control module(s) 990 can be configured to control a plurality of actuators 130 collectively. Thus, each of the plurality of actuators 130 can be activated or deactivated at substantially the same time, to substantially the same degree of actuation, and/or in substantially the same manner.

The various elements of the system 900 can be communicatively linked to one another or one or more other elements through one or more communication networks 995. As used herein, the term "communicatively linked" can include direct or indirect connections through a communication channel, bus, pathway or another component or system. A "communication network" means one or more components designed to transmit and/or receive information from one source to another. The data store(s) 920 and/or one or more other elements of the system 900 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 10, an example of a method 1000 is shown. The method 1000 can be used in connection with the morphable structure 100 described herein. For the sake of discussion, the method 1000 can begin with the morphable structure 100 and the actuator(s) 130 in a non-activated configuration. In the non-activated configuration, the actuator(s) 130 are in a non-inflated state. Thus, air or other inflating fluid is not supplied to the actuator(s) 130. An example of the actuator(s) 130 in the non-activated configuration and non-inflated state is shown in FIGS. 1 and 4. An example of the morphable structure 100 in the non-activated configuration is shown in FIG. 1

At block 1010, the outer surface 125 of the morphable structure 100 can be caused to morph. Such causing can be performed by causing the actuator(s) 130 to inflate into an activated configuration. The actuator(s) 130 can be inflated by causing air or other fluid from the inflation source(s) 940 to be supplied to the interior of the actuator(s) 130. Such causing can be performed by the processor(s) 910 and/or the control module(s) 990. For instance, the processor(s) 910 and/or the control module(s) 990 can send control signals to allow air or other fluid from the inflation source(s) 940 to be supplied to the interior of the actuator(s) 130. Thus, it will be appreciated that the body 132 of the actuator(s) 130 will expand from its non-inflated state (see, e.g., FIG. 4) and into an inflated state (see, e.g., FIG. 5). In going to the activated configuration, a dimension of the actuator 130 (e.g., the height h) increases.

The actuator(s) 130 can be caused to be inflated by the control module(s) 990 and/or the processor(s) 910. Such causing can be based on data acquired by the sensor(s) 930. Alternatively or additionally, the control module(s) 990 and/or the processor(s) 910 can detect a user input indicating that the morphable structure 100 should be morphed and/or that one or more of the actuators 130 should be inflated. The user input can be provided via the input interface(s) 970. Alternatively or additionally, the control module(s) 990 and/or processor(s) 910 can perform the causing in according with an actuation profile in the data store(s) 920.

The method 1000 can end. Alternatively, the method 1000 can return to block 1010 or some other block. For instance, the method 1000 can include activating the actuator(s) 130 to a desired or target level. The method 1000 can include causing the outer surface 125 of the morphable structure 100 to substantially return to the non-activated state by deflating the actuator(s) 130.

Turning to FIG. 11, another example of a method 1100 is shown. The method 1100 can be used in connection with the morphable structure 100 when it includes the actuator(s) 130 described above in connection with FIGS. 6-8. The body 132 of the actuator 130 is made of an active material with a transition temperature. When a temperature of the body 132 is below the transition temperature, the body 132 is rigid. As a result, supplying an inflating fluid to the actuator 130 will not cause the actuator 130 to inflate. When the temperature of the body 132 is above the transition temperature, the body 132 is flexible. In such case, when an inflating fluid is supplied to the actuator 130, the actuator 130 can inflate.

For the sake of discussion, the method 1100 can begin with the morphable structure 100 and the actuator(s) 130 in a non-activated configuration. In the non-activated configuration, the actuator(s) 130 are in a non-activated and non-inflated state. Thus, air or other inflating fluid is not supplied to the actuator(s) 130. An example of the actuator(s) 130 in the non-activated configuration and non-inflated state is shown in FIGS. 1 and 4. An example of the morphable structure 100 in the non-activated configuration is shown in FIG. 1 An example of the actuator(s) 130 in a non-activate configuration is shown in FIG. 4.

At block 1110, at least a portion of the body 132 can be heated above the transition temperature. In some arrangements, the at least a portion of the body 132 can be heated to a target level above the transition temperature, whereby a desired level of actuation is achieved when the body 132 is inflated. The body 132 can be heated by one or more heating elements 150 and/or one or more heaters. The one or more heating elements 150 and/or one or more heaters can be controlled by the control module(s) 990 and/or the processor(s) 910 based on data acquired by the sensor(s) 930. Alternatively or additionally, the control module(s) 990 and/or the processor(s) 910 can detect a user input indicating that the one or more heating elements 150 and/or one or more heaters should be activated. The user input can be provided via the input interface(s) 970. The method can continue to block 1120.

At block 1120, the body 132 of the actuator(s) 130 can be inflated to cause the outer surface of the morphable structure 100 to morph into an activated configuration. It will be appreciated that when the at least a portion of the body is heated above the transition temperature, the body 132 of the actuator(s) 130 becomes flexible. Thus, the actuator(s) 130 are in a condition to be inflated.

The body of the actuator can be inflated by causing air, liquid, or other fluid from the inflation source(s) 940 to be supplied to the interior of one or more of the actuators 130. Such causing can be performed by the processor(s) 910 and/or the control module(s) 990. For instance, the processor(s) 910 and/or the control module(s) 990 can send control signals to allow air or other fluid from the inflation source(s) 940 to be supplied to the interior of the actuator(s) 130. Thus, it will be appreciated that the body 132 will expand from its non-inflated state (see, e.g., FIG. 4) and into an inflated state (see, e.g., FIG. 5). In going to the activated configuration, a dimension of the actuator 130 (e.g., the height) increases.

Such causing can be based on data acquired by the sensor(s) 930. Alternatively or additionally, the control module(s) 990 and/or the processor(s) 910 can detect a user input indicating that the morphable structure 100 should be morphed and/or that one or more of the actuators 130 should be inflated. The user input can be provided via the input interface(s) 970. Alternatively or additionally, the control module(s) 990 and/or processor(s) 910 can perform the causing in according with an actuation profile in the data store(s) 920.

It will be appreciated that the inflation of the body can cause the actuator 130 to push on the outer layer 120 of the morphable structure 100. As a result, the outer layer 120 can morph into an activated configuration. The method can continue to block 1130.

At block 1130, when the body 132 is inflated, the temperature of the at least the portion of the body can be caused to decrease below the transition temperature. Such causing can be performed by the processor(s) 910 and/or the control module(s) 990. For instance, the processor(s) 910 and/or the control module(s) can send control signals to deactivate the heater(s) and/or the heating element(s) 150. As a result, the temperature of the body 132 will reduce due to heat exchange with the environment. In some arrangements, the processor(s) 910 and/or the control module(s) 990 can cause one or more cooling devices 960 to be activated to facilitate cooling of the body 132. For instance, the processor(s) 910 and/or the control module(s) 990 can send control signals to activate the cooling device(s) 960.

It will be appreciated that, when the temperature of the at least the portion of the body 132 decreases below the transition temperature, the body 132 can become rigid. Thus, further supply of inflating fluid to the body 132 will not result in a change in the activated configuration of the actuator 130. The method can continue to block 1140.

At block 1140, a supply of fluid to the body 132 can be discontinued. Such causing can be performed by the processor(s) 910 and/or the control module(s) 990. For instance, the processor(s) 910 and/or the control module(s) 990 can send control signals to stop the supply of air or other fluid from the inflation source(s) 940 to the interior of the actuator(s) 130. However, the body 132 is maintained in an activated configuration due to the rigidity of the body 132.

The method 1100 can end. Alternatively, the method 1100 can return to block 1110 or some other block.

One example of the use of arrangements described herein will now be described in connection with FIGS. 12A-D. These figures show an example of at least a portion of an actuator 130. It will be appreciated that the at least a portion of an actuator 130 can be a part of the actuator shown in FIGS. 6-8, such as at at least some of the edges 133. The body 132 of the actuator 130 can be made of a shape memory polymer. A heating element 150 can be embedded within the body 132 at an edge 133. As a result, the at least a portion of the actuator 130 can have a hinge-like configuration.

Figures 12A, 12B, 12C, 12D:
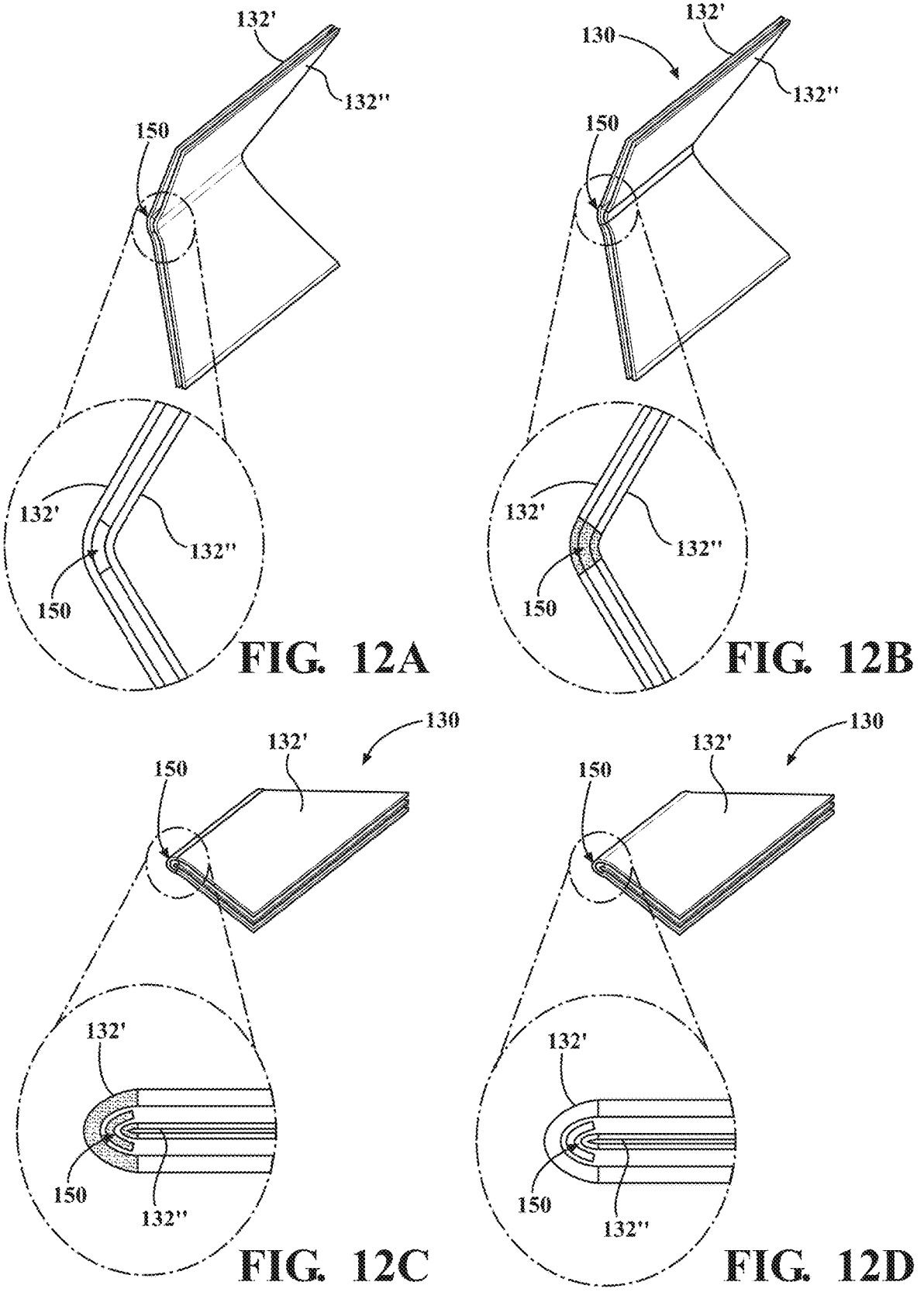
FIG. 12A shows an example of at least a portion of an actuator, showing an initial configuration in which a body of the actuator is rigid.
FIG. 12B shows the at least a portion of an actuator of FIG. 12A, showing a body of the actuator being heated by a heating element.
FIG. 12C shows the at least a portion of the actuator of FIG. 12A, showing the heated body of the actuator being deformable.
FIG. 12D shows the at least a portion of the actuator of FIG. 12A, showing the heated body cooling to become rigid.

FIG. 12A shows an initial configuration in which the body 132 of the at least a portion of an actuator 130 can be rigid. The temperature of the body 132 can be less than the transition temperature of the material of the body 132. Thus, the shape of the at least a portion of an actuator 130 can be locked.

In FIG. 12B, the heating element 150 can be activated. As a result, at least a portion of the body 132 can be heated by the heating element 150. FIG. 12C shows a condition in which the at least a portion of the body 132 is heated above the transition temperature. As a result, the actuator 130 is in a conformable or soft state. In this example, the portions of the body 132 move closer to each other, thereby decreasing the profile of the actuator 130. Such movement can be achieved by passively (e.g., under its own weight due to gravity) and/or actively (e.g., by drawing fluid out from the actuator 130).

When a desired configuration of the actuator 130 is achieved, the body 132 can be allowed to cool, such as by turning off the heating element 150 and/or by actively cooling (e.g., the cooling device(s) 960). When the temperature of the body 132 falls below the transition temperature, the body 132 can become rigid. FIG. 12D shows such a condition. Thus, any further supply or drawing of inflation fluid to or from the actuator 130 will not affect the shape of the actuator 130. Thus, the configuration of the body 132 can be locked.

In view of the above, it will be appreciated that the at least a portion of the actuator 130 shown in FIGS. 12A-12D can act like a hinge. By activating the heating elements 150 in such areas, the hinges of the actuator 130 can be softened.

Arrangements described herein can be used in various applications. For example, the morphable surface described can be used in connection with various vehicular applications. For instance, the morphable surface can be used for aerodynamic purposes when a vehicle is in motion. In some arrangements, the morphable surface can be used in connection with a vehicle spoiler. The morphing ability of the surface can be used to change the shape of the spoiler, thereby affecting the aerodynamic properties of the vehicle while in motion. In one example, the morphable surface can be used in connection with a front lip spoiler. The morphable surface can be integrated into and/or operatively connected to the front lip spoiler. In some driving conditions, it may be desirable to have the front lip spoiler as close to or as far away from the ground as possible to affect drag coefficient. Thus, by selectively activating and deactivating the morphable surface based on real-time conditions or in response to a user command, the shape of the front lip spoiler can be changed, which, in turn, affects the aerodynamic properties of the vehicle when in motion.

As another example, the morphable surface can be used in connection with a side skirt. The morphable surface can be integrated into and/or operatively connected to the side skirt. The side skirt can be extended or retracted based on real-time conditions or in response to a user command, which, in turn, affects the aerodynamic properties of the vehicle when in motion. Thus, by selectively activating and deactivating the morphable surface, the shape of the side skirt can be changed.

As a further example, the morphable surface can be used in connection with a smart bumper system, which can change the shape of the bumper based on real-time conditions or in response to a user command.

In some arrangements, the morphable surface can be used in connection with a vehicle seat. For example, the morphable surface can be used in connection with a side bolster of a vehicle seat. The morphable surface can be integrated into the vehicle seat or operatively connected to the vehicle seat. The morphable surface can be selectively activated or deactivated to change the shape of a car seat based on real-time conditions or in response to a user command. As a result, the seat can adapt to changes in the body size of different seat occupants.

As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport. Further, it will be appreciate that arrangements described herein are not limited to vehicular applications. Indeed, arrangements described herein can be used in various non-vehicular applications.

It will be appreciated that arrangements described herein can provide numerous benefits, including one or more of the benefits mentioned herein. For example, arrangements described herein can enable a surface to morphed into a desired shape or contour. Arrangements described herein can enable advanced surface contours and advanced shapes to be attained. Arrangements described herein can enable a high level of control of a surface. Arrangements described herein can allow for high resolution and sophisticated details in activated configuration(s) of the surface. Arrangements described herein can facilitate the tuning of a deployed dimension of an actuator by controlling inflation and/or activation. Arrangements described herein can allow for a lightweight and compact design. Arrangements described herein can allow an activated configuration to be maintained without further supply of inflating fluid. Arrangements described herein can reduce power consumption. Arrangements described herein can enable a single value system to be used for all actuators. Arrangements described herein can allow different presets to enable shape-changing of the surface into different functional states. Arrangements described herein can provide for remote and/or automated control of the shape/morphology of a body. Arrangements described herein can enable large and quick changes in shape, configuration, or morphology of a body based on real-time conditions.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. An actuator comprising:
  a body having a bellows configuration and being inflatable,
    the body being made of an active material with a transition temperature, when a temperature of the body is below the transition temperature, the body being rigid, and when the temperature of the body is above the transition temperature, the body being flexible, whereby the actuator is movable between activated and non-activated configurations by selectively inflating or deflating the body; and a heating element operatively positioned in contact with at least a portion of the body, whereby, when activated, the heating element causes the temperature of the body to increase, the heating element being embedded within the body.

2. An actuator comprising:

a body having a bellows configuration and being inflatable, the body being made of an active material with a transition temperature, when a temperature of the body is below the transition temperature, the body being rigid, and when the temperature of the body is above the transition temperature, the body being flexible, whereby the actuator is movable between activated and non-activated configurations by selectively inflating or deflating the body; and a heating element operatively positioned in contact with at least a portion of the body, whereby, when activated, the heating element causes the temperature of the body to increase, the heating element being located along one or more edges of the body.

3. The actuator of claim 1, wherein the active material is shape memory polymer.

4. The actuator of claim 1, wherein the actuator is a linear actuator.

5. A system comprising:

a base;

an outer layer defining an outer surface;

an actuator positioned between the base and the outer layer, the actuator including a body being inflatable and having a bellows configuration, the actuator being movable between an activated configuration and non-activated configuration by selective inflation or deflation of the body, the actuator being operatively positioned to cause the outer surface to morph when in an activated configuration; and a processor configurated to cause the body to be inflated by supplying a fluid to an interior of the body and to cause the body to be deflated by drawing out a fluid from the interior of the body.

6. The system of claim 5, wherein the body is made of an active material with a transition temperature, when a temperature of the body is below the transition temperature, the body is rigid, and when the temperature of the body is above the transition temperature, the body is flexible.

7. The system of claim 6, wherein the processor is further configured to cause the temperature of the body to be adjusted.

8. The system of claim 7, wherein the actuator includes a heating element operatively positioned in contact with at least a portion of the body, whereby, when activated, the heating element causes the temperature of the body to increase.

9. The system of claim 8, wherein the heating element is embedded within the body.

10. The system of claim 7, further including a heater operatively positioned relative to the body, wherein the processor is operatively connected to selectively activate and deactivate the heater, whereby, when the heater is activated, the temperature of the body increases.

11. The system of claim 7, further including a cooling device operatively positioned related to the body, wherein the processor is operatively connected to selectively activate and deactivate the cooling device, whereby, when the cooling device is activated, the temperature of the body decreases.

12. A system comprising:

a base;

an outer layer defining an outer surface; and an actuator positioned between the base and the outer layer, the actuator including a body being inflatable and having a bellows configuration, the actuator being movable between an activated configuration and non-activated configuration by selective inflation or deflation of the body, the actuator being operatively positioned to cause the outer surface to morph when in an activated configuration, the actuator being a plurality of actuators, the plurality of actuators being independent actuatable.

13. A method, a structure including an outer layer defining an outer surface, the structure including an actuator positioned between a base and outer layer, the actuator including a body being inflatable and having a bellows configuration, the body being made of an active material with a transition temperature, the actuator being movable between a non-activated configuration and one or more activated configurations, the method comprising:

causing the outer surface to morph by inflating the body, whereby a dimension of the body increases; and prior to inflating the body, heating at least a portion of the body to a target level above the transition temperature, whereby a desired level of actuation is achieved when the body is inflated.

14. A method, a structure including an outer layer defining an outer surface, the structure including an actuator positioned between a base and outer layer, the actuator including a body being inflatable and having a bellows configuration, the body being made of an active material with a transition temperature, the actuator being movable between a non-activated configuration and one or more activated configurations, the method comprising:

causing the outer surface to morph by inflating the body, whereby a dimension of the body increases;

prior to inflating the body, heating at least a portion of the body above the transition temperature; and when the body is inflated, causing a temperature of the at least the portion of the body to decrease below the transition temperature, whereby the body becomes rigid.

15. The method of claim 14, further including:

discontinuing a supply of fluid to the body, whereby the body is maintained in an activated configuration due to the body being rigid.

16. The actuator of claim 2, wherein the active material is shape memory polymer.

17. The actuator of claim 2, wherein the actuator is a linear actuator.

* * * * *